(12) United States Patent
Tsukada

(10) Patent No.: US 7,778,131 B2
(45) Date of Patent: Aug. 17, 2010

(54) OPTICAL DISK WRITING AND ENERGY CONTROL APPARATUS

(75) Inventor: Seiji Tsukada, Daito (JP)

(73) Assignee: Funai Electric Co., Ltd., Osaka (JP)

( * ) Notice: Subject to any disclaimer, the term of this patent is extended or adjusted under 35 U.S.C. 154(b) by 1082 days.

(21) Appl. No.: 11/173,596

(22) Filed: Jul. 1, 2005

(65) Prior Publication Data
US 2006/0007825 A1    Jan. 12, 2006

(30) Foreign Application Priority Data
Jul. 6, 2004    (JP)    ............... 2004-199552

(51) Int. Cl.
G11B 7/00    (2006.01)
(52) U.S. Cl. ............. 369/53.36; 369/53.26; 369/47.33; 369/47.11
(58) Field of Classification Search ............... None
See application file for complete search history.

(56) References Cited

U.S. PATENT DOCUMENTS

| | | | | |
|---|---|---|---|---|
| 5,774,435 | A * | 6/1998 | Hirano | 369/47.22 |
| 6,636,468 | B2 * | 10/2003 | Salmonsen et al. | 369/47.53 |
| 7,184,379 | B2 * | 2/2007 | Tsukihashi et al. | 369/47.43 |
| 7,269,113 | B2 * | 9/2007 | Spruit | 369/53.33 |
| 2001/0006497 | A1 * | 7/2001 | Shin | 369/47.33 |
| 2003/0021199 | A1 * | 1/2003 | Suzuki | 369/47.33 |

FOREIGN PATENT DOCUMENTS

| | | |
|---|---|---|
| JP | 2001-297439 | 10/2001 |
| JP | 2001-312822 | 11/2001 |
| JP | 2002-352426 | 12/2002 |
| JP | 2004-110993 | 4/2004 |

OTHER PUBLICATIONS

Machine English Translation of Hagiwara (JP 2001-297439A) provided by the Japanese Patent Office website.*
Patent Abstracts of Japan, Publication No. 2001-312822, Publication Date: Nov. 9, 2001, 1 page.
Patent Abstracts of Japan, Publication No. 2004-110993, Publication Date: Apr. 8, 2004, 1 page.
Patent Abstracts of Japan, Publication No. 2002-352426, Publication Date: Dec. 6, 2002, 1 page.
Japanese Office Action for Japanese Application No. 2004-199552, mailed on Aug. 26, 2008 (4 pages).
esp@cenet patent abstract for Japanese Publication No. 2001297439, Publication date Oct. 26, 2001 (1 page).

* cited by examiner

Primary Examiner—Jorge L Ortiz Criado
(74) Attorney, Agent, or Firm—Osha • Liang LLP

(57) ABSTRACT

An optical disk writing apparatus maintaining appropriate write power in real time with a simple configuration includes a buffer for recording data, a binarization circuit supplying data to the buffer, an LD writing data recorded in the buffer onto a DVD disk, a detector reading out from the DVD disk a signal representing data written by the LD at an arbitrary time during a period starting from when the amount of data recorded in the buffer and not yet written onto the DVD disk becomes zero until the amount of data reaches a predetermined number of ECC blocks, and a servo processor correcting an error in the data read out by the detector for every data amount susceptible to error correction at one time, evaluating the writing of the LD using the corrected signal, and controlling the energy density to be employed in writing data onto the DVD disk by the LD according to its own evaluation.

3 Claims, 6 Drawing Sheets

OPTICAL DISK WRITING AND ENERGY CONTROL APPARATUS

BACKGROUND OF THE INVENTION

1. Field of the Invention

The present invention relates to optical disk writing apparatuses, and particularly, to an optical disk writing apparatus that can control output.

2. Description of the Related Art

"Write Pause" refers to a standby status of output during a recording operation of an optical pickup. In a conventional optical pickup, the level of output is modified to the output obtained by OPC (Optical Power Control) when output is to be adapted to a writing state. It cannot be said that the output of the optical pickup in such a case is optimum. Accordingly, there is developed a method to correct the output of the optical pickup concurrently with the actual recording operation (running OPC).

Running OPC is disadvantageous in that it is difficult to correct the output properly when the period of time of emission of a laser beam is short since control becomes complex. In view of such a problem, various methods of controlling the output of a pickup properly in a simple manner have been proposed.

The running OPC disclosed in Japanese Patent Laying-Open No. 2001-312822 includes the steps of irradiating an optical disk with at least two laser beams, i.e. a first laser beam having an intensity that can form a pit on the recording plane of the optical disk and a second laser beam having an intensity lower than the lowest intensity required to form a pit and higher than the lowest intensity required for reproduction, forming a pit corresponding to a recording signal on the optical disk using the first laser beam as well as reading out an RF (Radio Frequency) signal of the pit formed by the first laser beam, using the second laser beam, and correcting the recording power of the first laser beam based on an asymmetry value of the RF signal read out by the second laser beam.

This method allows measurement of an accurate asymmetry value through simple control to conduct running OPC of high precision.

Japanese Patent Laying-Open No. 2004-110993 discloses a method of selecting laser power required to record a modulation code onto an information recording medium using a laser. This method includes the steps of recording a predetermined signal pattern on an information recording medium, reproducing the recorded predetermined signal pattern and calculating an asymmetry value from the reproduced predetermined signal pattern, obtaining the rate of change of the laser power of the asymmetry value, and selecting the laser power corresponding to the highest rate of change.

In accordance with this method, a recording power can be selected based on the asymmetry value even for a recording medium that conventionally could not use an asymmetry value.

The optical disk recording method disclosed in Japanese Patent Laying-Open No. 2002-352426 includes the steps of modulating the optical beam to have a recording power corresponding to recording and another power corresponding to the case where recording is not conducted, and irradiating the track of the optical disk, according to the recording signal, with the appropriate power to record a recording signal, wherein detection is made of the component of periodic fluctuation in the output of the optical beam that occurs repeatedly according to the disk orbit, and correcting the optical beam output in a recording power mode so as to cancel the periodic fluctuation component.

In accordance with this method, recording of high quality can be carried out even if wobbling or eccentricity occurs at the optical disk. Further, an appropriate recording power can be detected at high accuracy even if the optical disk exhibits wobbling or eccentricity.

The approach of irradiating an optical disk with at least two laser beams, and correcting the recording power of the first laser beam based on the asymmetry value of an RF signal read out by the second laser beam, as disclosed in Japanese Patent Laying-Open No. 2001-312822, is disadvantageous in that control becomes complex. This is due to the fact that control of each of the plurality of laser beams is required. Since tracking is generally required, an optical pickup apparatus must control a plurality of laser beams. Such laser beams are primary emitted for the purpose of tracking. Therefore, the control will become complex when the intensity of the laser beam is to be controlled for recording based on a plurality of laser beams. Even if a technique is developed to render the laser beam for tracking dispensable in the future, the need to control a plurality of laser beams will still arise.

The method disclosed in Japanese Patent Laying-Open No. 2004-110993 obtains the output through the OPC set forth above. Therefore, there is a problem that the output of the optical pickup is not optimum.

When the periodic fluctuation component of an optical beam output is detected and the optical beam output in a recording power mode is to be corrected so as to cancel the detected periodic fluctuation component, as disclosed in Japanese Patent Laying-Open No. 2002-352426, the periodic fluctuation of output is just suppressed taking advantage of reflected light. Such an approach involves the problem that optimization of the laser output is still required to be further improved.

SUMMARY OF THE INVENTION

In view of the foregoing, an object of the present invention is to provide an optical disk writing apparatus that can maintain appropriate write power in real time with a simple configuration (as a result, the recording quality is improved to allow reduction in the error rate even for media with lower fabrication quality).

According to an aspect of the present invention, an optical disk writing apparatus includes a buffer for recording data, a binarization circuit supplying data to the buffer, a laser oscillator writing the data recorded in the buffer onto an optical disk, a detector reading out from the optical disk a signal representing data written by the laser oscillator at an arbitrary time during a period starting from when the amount of data recorded in the buffer and not yet written into the optical disk becomes zero and until that amount of data reaches an amount corresponding to integral multiples of the amount of data susceptible to error correction at one time, a correction processor correcting an error in the data read out by the detector for every amount of data susceptible to error correction at one time, an evaluation processor evaluating the writing quality of the laser oscillator using the signal corrected by the correction processor, and a control processor controlling the energy density to be employed in writing data onto the optical disk by the laser oscillator according to the evaluation by the evaluation processor.

Accordingly, the period of time during which data writing must be conducted concurrently with data reading can be set to zero. By eliminating such a period, control can be provided in a more real-time manner. Further, error correction is allowed. By virtue of error correction, the requirement of confirming whether the data has been read properly or not at every reading of data can be relieved. Accordingly, the configuration of the detector can be set more simple while maintaining real-time control. Furthermore, the energy density employed at the time of the laser oscillator writing data onto an optical disk can be controlled appropriately. Thus, an optical disk writing apparatus that can maintain appropriate write power in a more real-time manner with a more simple configuration can be provided.

According to another aspect of the present invention, an optical disk writing apparatus includes a buffer for recording data, a supply circuit supplying data to the buffer, a writing device writing the data recorded in the buffer to an optical disk, a detector reading out from the optical disk a signal representing data written by the writing device during a period in which the amount of data recorded in the buffer and not yet written into the optical disk is less than a predetermined amount, an evaluation processor evaluating the writing quality of the writing device using the signal read out by the detector, and a control processor to control the energy density to be employed in writing data onto the optical disk by the writing device according to the evaluation by the evaluation processor.

Since data can be read out during intervals between data writing, the configuration of the detector is simplified. The energy density to be employed at the time of the writing device writing data onto the optical disk is controlled appropriately. Further, real-time control is allowed. This is because evaluation by the evaluation processor can be conducted between intervals of data supply by the supply circuit. Thus, an optical disk writing apparatus that can maintain appropriate write power in real time with a simple configuration can be provided.

The detector set forth above preferably reads out a signal at an arbitrary time during a period starting from when the amount of data becomes zero and until the amount of data reaches a predetermined amount.

Accordingly, the period of time during which data writing must be conducted concurrently with data reading can be set to zero. Elimination of such a period allows control in a more real-time manner. Thus, an optical disk writing apparatus that can maintain appropriate write power in a more real-time manner with a simple configuration can be provided.

The predetermined amount set forth above is preferably an amount corresponding to integral multiples of the amount of data susceptible to error correction at one time.

Accordingly, the data read out can be handled more easily. This provides the advantage that the configuration of the detector can be set more simple while allowing real-time control. Thus, an optical disk writing apparatus that can maintain appropriate write power in a more real-time manner with a simpler configuration can be provided.

Preferably, the optical disk writing apparatus set forth above further includes a correction processor that can correct an error in data read out by the detector for every amount of data susceptible to error correction at one time. The evaluation processor preferably includes a processor evaluating the writing by the writing device using the signal corrected by the correction processor.

Since the correction processor corrects the error, the requirement of confirming whether data has been read out properly or not at every data read out is relieved. Accordingly, the configuration of the detector can be set more simple while maintaining real-time control. Thus, an optical disk writing apparatus that can maintain appropriate write power in a more real-time manner with a simpler configuration can be provided.

The foregoing and other objects, features, aspects and advantages of the present invention will become more apparent from the following detailed description of the present invention when taken in conjunction with the accompanying drawings.

DESCRIPTION OF THE PREFERRED EMBODIMENT

Figure 1:
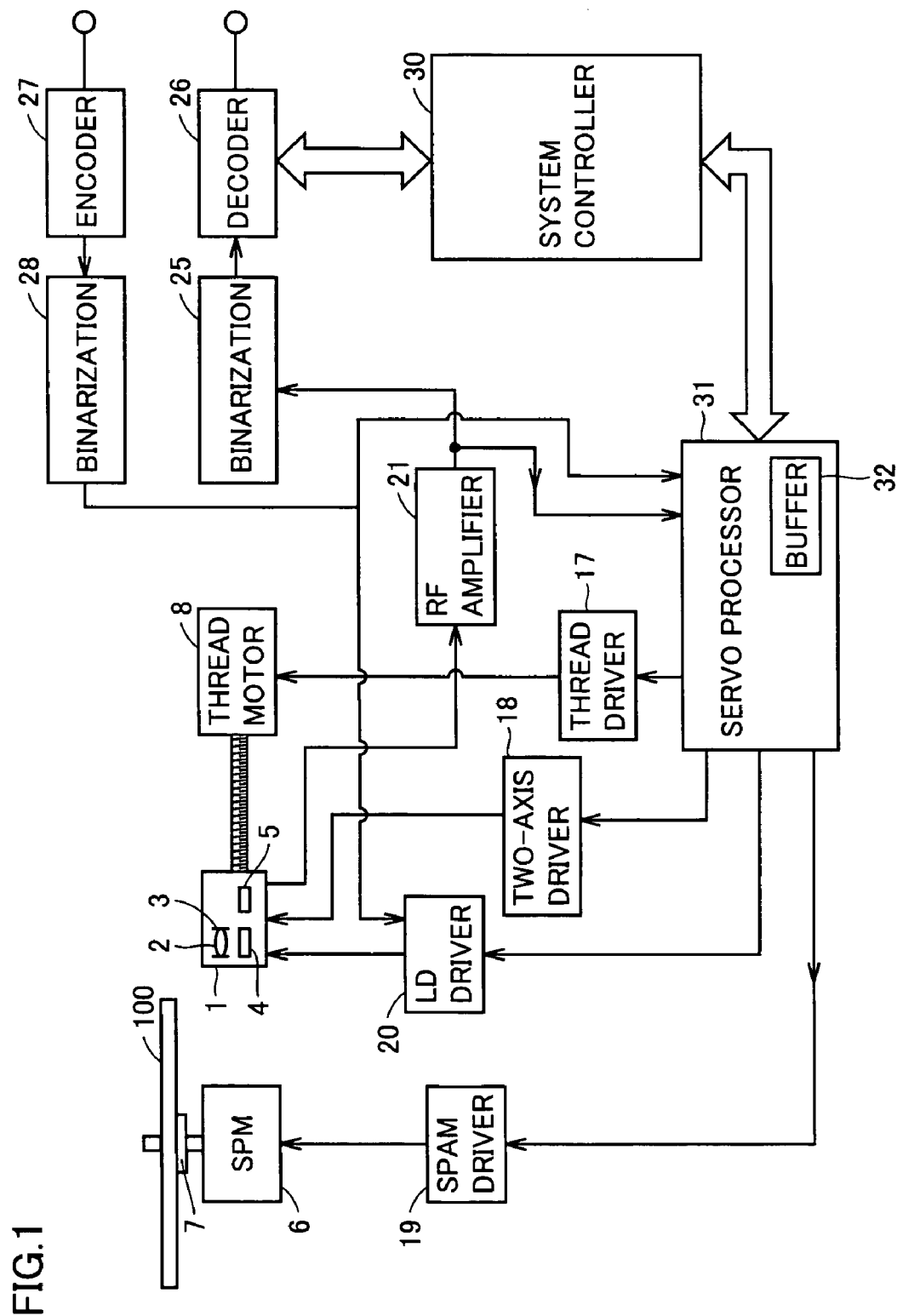
FIG. 1 represents the entire configuration of an optical disk writing apparatus according to an embodiment of the present invention.

Referring to FIG. 1, an optical disk writing apparatus according to an embodiment of the present invention includes a turntable 7 on which a DVD (Digital Versatile Disk) 100 identified as an optical disk is mounted, a spindle motor 6 for rotating turntable 7, a spindle motor drive 19 for driving spindle motor 6, an optical pickup 1 to emit a laser beam towards DVD 100, an LD (Laser Diode) driver 20 to operate emission of a laser beam by optical pickup 1, a two-axis driver 18 including a focus driver and a tracking driver for optical pickup 1, a thread motor 8 for the operation of optical pickup 1, a thread driver 17 to control thread motor 8, an RF amplifier 21 to amplify the RF signal of a reproduced signal output from optical pickup 1, a binarization circuit 25 for binarizing the RF signal output from RF amplifier 21, a decoder 26 decoding a signal subjected to binarization to output reproduction data, an encoder 27 encoding recording data to be recorded onto DVD 100, a binarization circuit 28 converting the signal output from encoder 27 into a signal that can be used by LD driver 20 and supplying the converted signal to LD driver 20 and a buffer 32 that will be described afterwards, a servo processor 31, and a system controller 30 controlling servo processor 31 and decoder 26.

Optical pickup 1 includes a lens 2, a two-axis mechanism 3, an LD 4 (a laser oscillator that writes the data recorded in buffer 32 onto DVD 100), and a detector 5.

Servo processor 31 controls thread driver 17, two-axis driver 18, spindle motor driver 19, and laser driver 20. Servo processor 31 incorporates buffer 32. The data required for servo processor 31 to execute various control is recorded in buffer 32.

In operation, when a DVD 100 is placed on turntable 7 for reproduction, a laser beam having its output controlled via LD driver 20 is output from LD 4 of optical pickup 1 to pass through lens 2. This laser beam is emitted onto a recording layer 102 or a recording layer 104 that will be described afterwards. Reflected light therefrom is detected by detector 5 to be converted into an electrical signal. Thus, a signal recorded as a pit or the like on DVD detector 100 is read out as an electrical signal by detector 5. The converted electrical signal is supplied to RF amplifier 21.

RF amplifier 21 generates a required signal based on the applied signal. For example, an RF signal identified as reproduction data and a focus error signal for servo control are generated. Additionally, a tracking error signal and the like are generated. First, the RF signal and focus error signal will be described here.

The RF signal output from RF amplifier 21 is supplied to binarization circuit 25. The focus error signal is supplied to servo processor 31.

The RF signal is subjected to binarization at binarization circuit 25 to be supplied to decoder 26. Decoder 26 carries out a predetermined decoding process. Accordingly, information read out (reproduced) from DVD 100 is output.

Servo processor 31 generates a focus drive signal according to the focus error signal from RF amplifier 21 to output the generated focus drive signal to two-axis driver 18. Two-axis driver 18 receives the focus drive signal to drive two-axis mechanism 3 of optical pickup 1 according to the input focus drive signal. Thus, optical pickup 1, RF amplifier 21, servo processor 31 and two-axis driver 18 constitute a tracking servo loop and focus servo loop. For the sake of simplification, description of the tracking servo loop will not be provided here.

Servo processor 31 generates and provides to thread driver 17 a thread driving signal based on access execution control and the like from system controller 30. Thread driver 17 responds to the supplied thread driving signal to drive thread motor 8. Accordingly, optical pickup 1 is slid (moved) properly.

LD 4 of optical pickup 1 is driven to emit a laser beam by LD driver 20. Servo processor 31 generates a laser driving signal for execution of laser emission of optical pickup 1 in a reproduction mode or the like based on designation from system controller 30 or a signal obtained by converting recording data. The generated laser driving signal is supplied to laser driver 20 to control the light emitting operation of LD 4.

Figure 2:
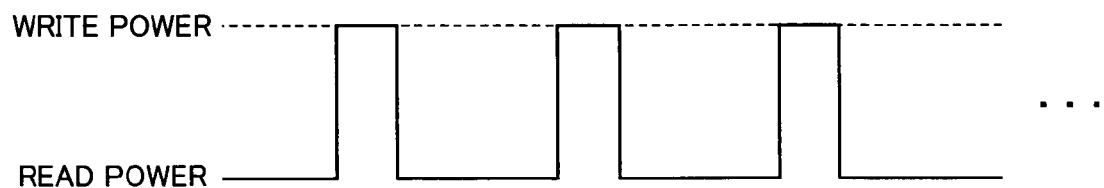
FIG. 2 represents the output level of a laser diode (LD) according to an embodiment of the present invention.

Fluctuation of a laser beam output from LD 4 will be described with reference to FIG. 2. LD 4 constantly outputs a laser beam. This is because a tracking signal or focus signal must be generated based on the reflected light from the DVD to control the pickup position. The intensity of a laser beam is divided into two levels. The intensity of a laser beam at the time of recording data onto DVD 100 (energy density of the laser beam) is referred to as the "write power". The other intensity of the laser beam (at the time of a standby state or reading out data from DVD 100) is referred to as the "read power".

Figure 3A:
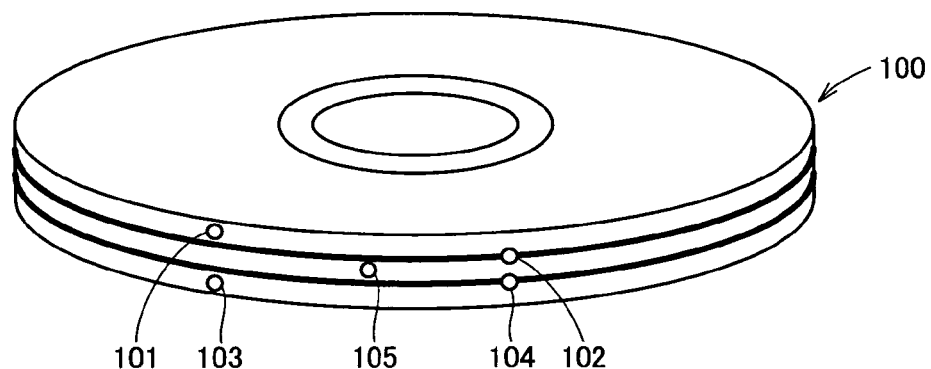
FIGS. 3A and 3B represent a configuration of an optical disk according to an embodiment of the present invention.
Figure 3B:
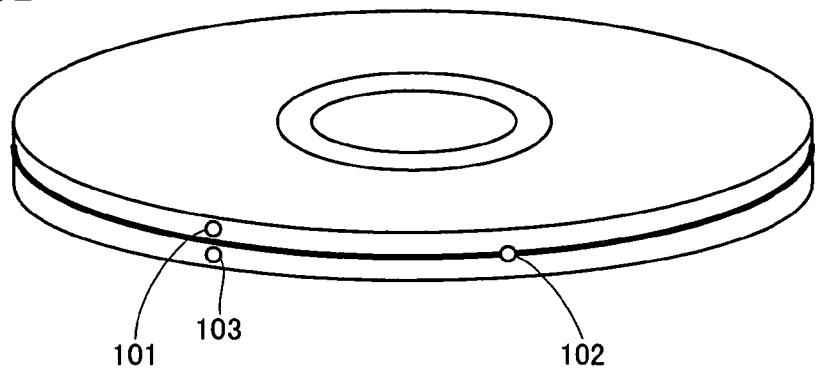

The configuration of a DVD will be described with reference to FIGS. 3A and 3B. FIG. 3A corresponds to a DVD having two recording layers. FIG. 3B corresponds to a DVD having one recording layer. DVD 100 of FIG. 3A includes a disk having a recording layer 102 formed on a substrate 101 and a disk having a recording layer 104 formed on a substrate 103. Each of the two disks are laminated together with a space layer 10 therebetween. The DVD disk of FIG. 3B has a configuration in which a disk with recording layer 102 formed on substrate 101 and a disk on substrate 103 are directly laminated on each other. Substrates 101 and 103 are formed of a transparent material such as polycarbonate resin. Space layer 105 is formed of a resin material directed to bonding the substrates. The material of this resin is light-transmittive. It is to be understood that the optical disk writing apparatus of the present embodiment may use the DVD disk of FIG. 3B instead of DVD 100 of FIG. 3A in the description set forth below.

The optical disk writing apparatus of the present embodiment emits a laser beam from optical pickup 1 onto a track on recording layer 102 or recording layer 104 of DVD 100 rotated by spindle motor 6, and reads out data by detecting reflected light therefrom.

For a reproduction operation by a laser beam, the laser beam spot must be maintained in focus on recording layer 102 or 104. To this end, the optical disk writing apparatus of the present embodiment is equipped with a focus servo mechanism to control the focus status by moving lens 2 that is the output end of the laser beam in a direction towards or away from DVD 100.

The focus servo mechanism generally includes two-axis mechanism 3 formed of a focus driver and tracking driver that moves objective lens 2 in a direction towards or away from DVD 100, and a focus servo control system generating a focus error signal from information of reflected light from DVD 100 to operate a focus drive signal based on the focus error signal, and applying current to a focus coil not shown of two-axis mechanism 3. In other words, the focus servo mechanism is configured as a feedback control system.

Figure 4:
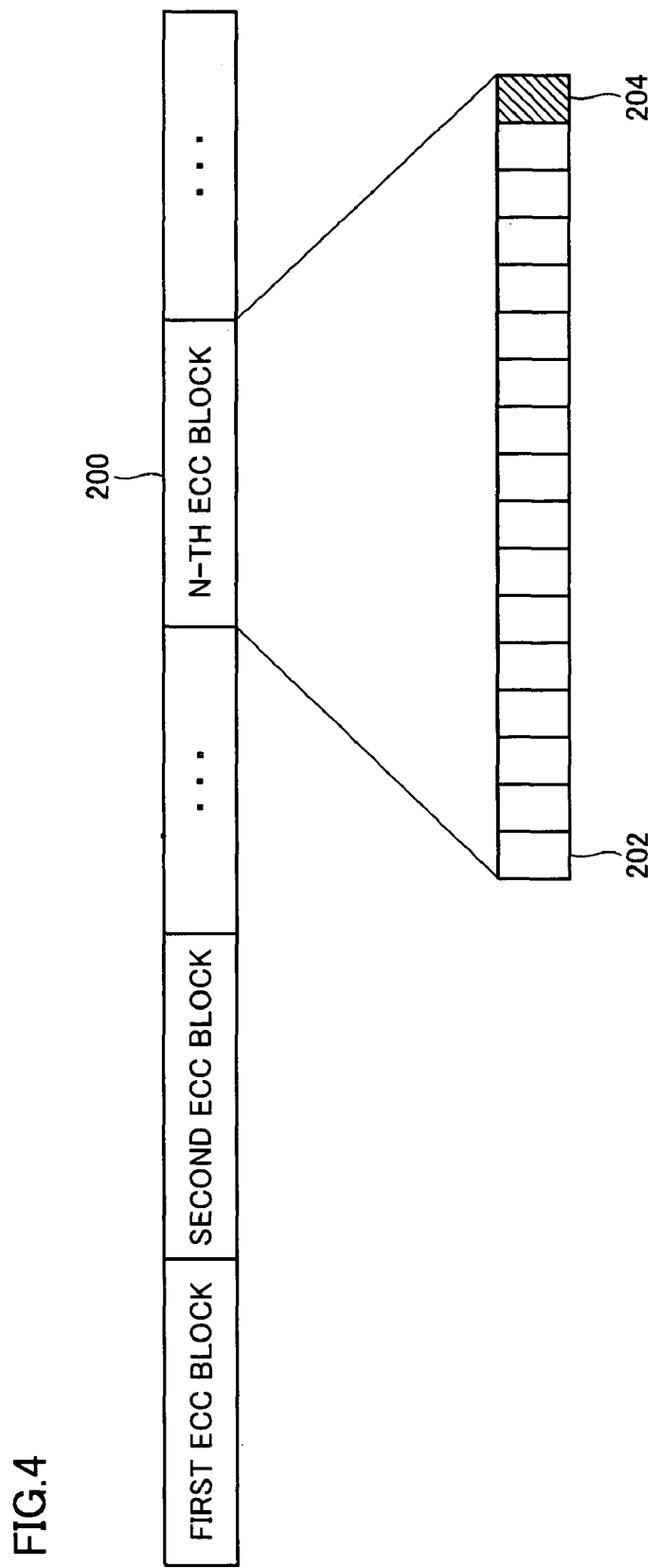
FIG. 4 represents the format of an optical disk according to an embodiment of the present invention.

The format of DVD 100 of the present embodiment will be described with reference to FIG. 4. The recording region of DVD 100 corresponds to a plurality of ECC (Error-Correcting Code) blocks 200. Each of ECC block 200 is formed of 16 regions of sectors 202 and one region of an error correction code 204. By such a configuration, the optical disk writing apparatus cannot determine whether the data read out is proper or not unless one ECC block 200 is entirely read out. In other words, one ECC block corresponds to the amount of data that can have an error corrected at one time.

The program executed by the optical disk writing apparatus has a control configuration set forth below in association with write power control.

At step 100 (step abbreviated as S hereinafter), detector 5 of optical pickup 1 detects light reflected from DVD 100. Thread motor 8 drives optical pickup 1 so as to move to a region immediately beneath DVD 100. At this point in time, optical pickup 1 is moved to a position where a signal from DVD 100 can be read out. Detector 5 converts the detected reflected light into an electrical signal. RF amplifier 21 amplifies the signal converted by detector 5. Servo processor 31 decodes the signal amplified by RF amplifier 21 and reads out the optimum value of an asymmetry value recorded on DVD 100 (this value differs for every type of the DVD product, which is in the range of −0.02 to 0.12 for DVDs available in the market). By reading out this value, the optical disk writing apparatus can record data in an optimum state.

Upon reading out the optimum value of the asymmetry value, servo processor 31 outputs a driving signal (a signal representing the intensity of the laser beam output from LD 4, or a signal representing data recorded on DVD 100) to LD driver 20. LD driver 20 controls LD 4 according to the driving signal. LD 4 emits a laser beam according to control of LD driver 20. Thus, data is recorded on DVD 100. Servo processor 31 records a predetermined number of signals onto DVD 100 such that the intensity of a laser beam differs from each other. When a signal is recorded on DVD 100, servo processor 31 reads out via detector 5 and RF amplifier 21 a signal recorded such that the laser beam intensity differs from each other.

When a signal is read out, servo processor 31 calculates an asymmetry value for each signal. Following calculation of an asymmetry value, servo processor 31 records in buffer 32 the intensity of the laser beam when the signal was recorded onto DVD 100 and an asymmetry value in correspondence.

When the intensity of the laser beam and asymmetry value are recorded for all the signals, servo processor 31 obtains an approximate expression representing the relationship between the laser beam intensity and asymmetry value from the recorded value. The approximate expression representing the relationship between the laser beam intensity and asymmetry value can be expressed in a form approximating a quadratic curve. The method of obtaining such an approximate expression is not particularly limited.

For example, the approximate expression may be obtained as set forth below. At the first step, the laser beam intensity is inserted into the equation of the quadratic curve having an arbitrary coefficient to calculate an asymmetry value. At the second step, the difference between the calculated value and the measurement value of the asymmetry value is obtained. At the third step, an equation of a quadratic curve with the smallest difference between the calculated value and the measurement value of the asymmetry value is identified.

Upon obtaining an approximate expression, encoder 27 converts the recording data into signals. Binarization circuit 28 binarizes the data converted by encoder 27. Servo processor 31 causes LD 4 to record the binarized data from binarization circuit 28 at an intensity corresponding to the asymmetry value read out in advance. Servo processor 31 causes LD 4 to record data by providing a driving signal to LD driver 20. LD driver 20 controls LD 4 according to the driving signal such that LD 4 records data. LD 4 emits a laser beam according to the control of LD driver 20 to initiate data recording onto DVD 100.

Figure 6:
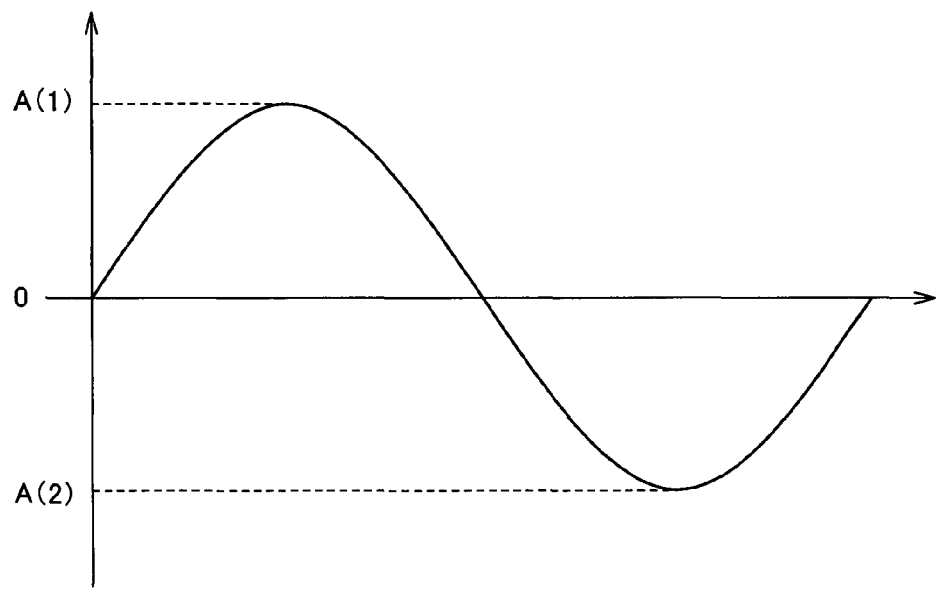
FIG. 6 is a diagram to describe an asymmetry value according to an embodiment of the present invention.

The aforementioned asymmetry value will be described herewith reference to FIG. 6. An asymmetry value represents the symmetric property of a signal. It is assumed that the positive maximum value of the signal is A (1) and the negative maximum value of the signal is A (2). The asymmetry value β is represented by the following equation:

$$\beta = \{A(1) + A(2)\} \div \{A(1) - A(2)\}$$

At S102, servo processor 31 deletes the data output as a driving signal to LD driver 20 from the data recorded in buffer 32. Following deletion of this data, servo processor 31 outputs one of the data remaining in buffer 32 to LD driver 20 as a driving signal. Servo processor 31 repeats the operation of providing data to LD driver 20 and deleting the output data until there is no remaining data recorded in buffer 32.

At S104, servo processor 31 outputs to LD driver 20 a driving signal indicative of the data output being returned to the level of read power. LD driver 20 controls LD 4 such that the output of LD 4 attains the level of read power.

At S106, servo processor 31 outputs a focus drive signal to two-axis driver 18. This servo driver signal is a signal indicative of the readout position of optical pickup 1 being shifted several previous ECC blocks backwards, i.e. returning back several ECC blocks. In the present embodiment, seek is performed to set the reading position of optical pickup 1 to two previous ECC blocks backward. Two-axis driver 18 receives this focus drive signal to control two-axis mechanism 3 of optical pickup 1. Thus, the reading position of optical pickup 1 is shifted several previous ECC blocks backward.

At S108, detector 5 of optical pickup 1 detects the reflected light from DVD 100. Detector 5 converts the detected reflected light into an electrical signal. RF amplifier 21 amplifies the signal converted by detector 5. Servo processor 31 corrects an error in the data read out by detector 5 and amplified by RF amplifier 21 for every one ECC block. Servo processor 31 records the error-corrected signal into buffer 32. Servo processor 31 obtains an asymmetry value based on the amplitude of the signal amplified by RF amplifier 21 (the positive maximum value and negative maximum value) subsequent to error correction.

At S110, servo processor 31 obtains the optimum write power that is to be employed in subsequent recording of a signal based on the relationship between the asymmetry value and write power. The optimum write power (the optimum laser beam intensity) is obtained as set forth below. At the first step, data matching the asymmetry value obtained at S108 is searched for from the data of the laser beam intensity and asymmetry value obtained at S100. At the second step, data corresponding to the asymmetry value obtained at S108 is searched for from the data indicating the laser beam intensity. When there is no data corresponding to the asymmetry value obtained at S108, servo processor 31 inserts the asymmetry value obtained at S108 into the data recorded in buffer 32. Accordingly, servo processor 31 can calculate the laser beam intensity. The intensity of a laser beam thus obtained is the optimum write power.

At S112, encoder 27 converts the recording data into signals. Binarization circuit 28 converts the signal output from encoder 27 into a signal that can be used by LD driver 20. Servo processor 31 records the signal converted by binarization circuit 28 into its own buffer 32 as data. Servo processor 31 repeats this procedure until the capacity of buffer 32 is full. Servo processor 31 waits for data to be accumulated in buffer 32 during repetition of such a process.

At S114, servo processor 31 outputs the optimum write power obtained at S110 and a driving signal representing the data recorded in buffer 32 to LD driver 20. LD driver 20 controls LD 4 according to the signal output from servo processor 31. LD 4 resumes data recording at the optimum write power obtained at S110. Accordingly, servo processor 31 controls the write power employed when LD 4 is to write data into DVD 100, according to its own evaluation on the writing quality of LD 4. The data recorded onto DVD 100 is deleted from buffer 32.

Figure 5:
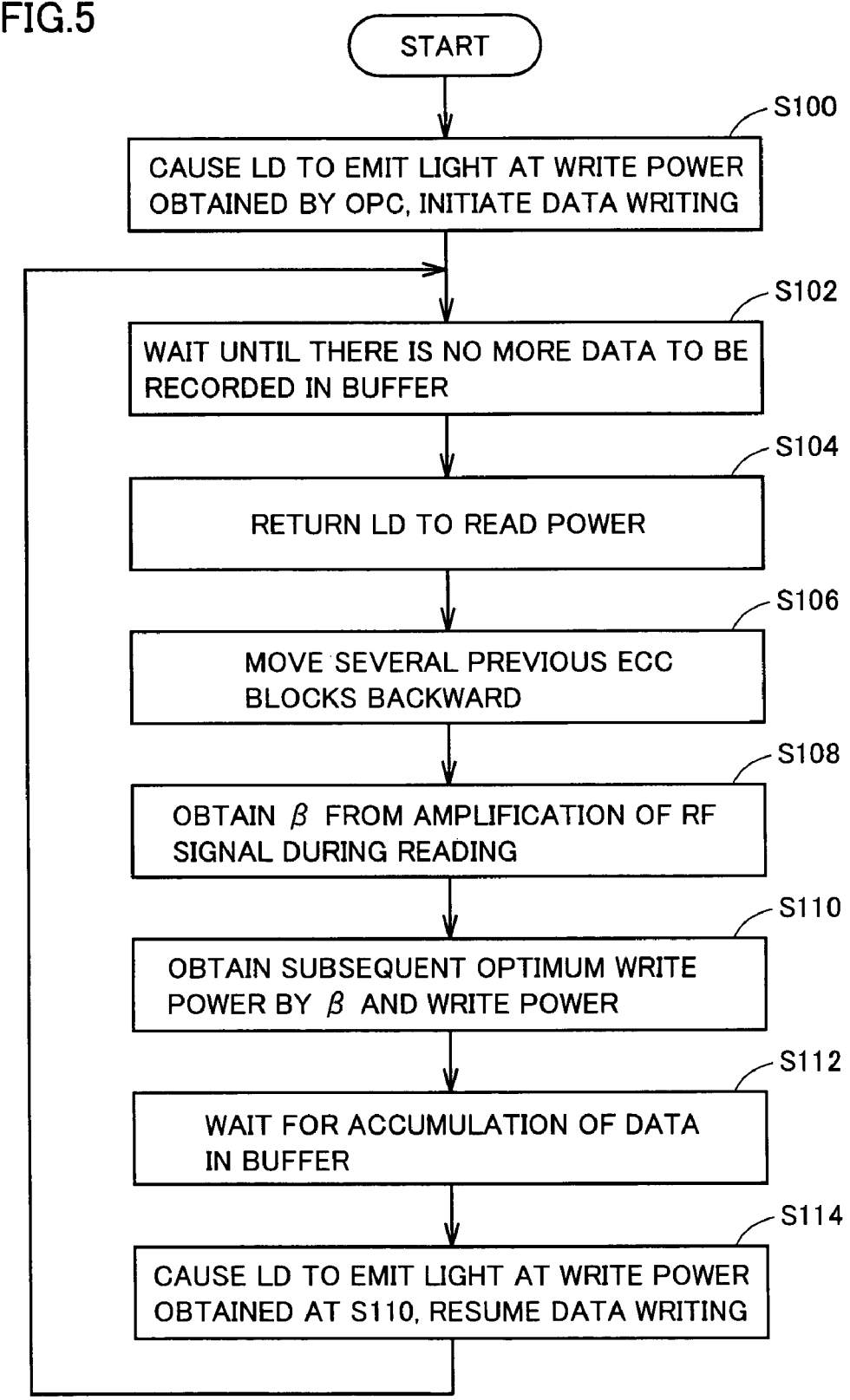
FIG. 5 is a flow chart of the procedure of the control process of write power according to an embodiment of the present invention.

The operation of the optical disk writing apparatus of the present invention will be described hereinafter in accordance with the configuration set forth above and the flow chart of FIG. 5.

LD 4 initiates data recording onto DVD 100 (S100). Upon initiating data recording, servo processor 31 repeats the operation of providing data to LD driver 20 and erasing the output data until there is no more data recorded in buffer 32 (S102). When there is no more data remaining in buffer 32, LD driver 20 controls LD 4 such that the output level of LD 4 corresponds to the read power level (S104).

Under control of LD 4, the readout position of optical pickup 1 is moved several previous ECC blocks backward (S106). Upon the shift of the readout position of optical pickup 1, detector 5 reads out from DVD 100 a signal representing the data written by LD 4 at an arbitrary time during a period of time in which the amount of data recorded in buffer 32 and not yet written into DVD 100 is less than an amount corresponding to a predetermined number of ECC blocks. As used herein, the "period of time in which the amount of data is less than a predetermined number of ECC blocks" refers to a period starting from when the amount of data is zero and until the amount of data reaches an amount corresponding to several ECC blocks. In the present embodiment, the "arbitrary time during a period of time until the amount of data reaches an amount corresponding to several ECC blocks" depends upon which region in DVD 100 data is to be written. It is to be noted that, if the time of "reaching an amount corresponding to several ECC blocks" is definite, detector 5 reads out a signal before that definite time. The method of identifying the time of "reaching an amount corresponding to several ECC blocks" is arbitrary. For example, the method of regulating the region in which a signal is to be recorded can be considered as one such method thereof.

Following signal readout, servo processor 31 corrects an error in the data read out by detector 5 for every one ECC block. Following error correction, servo processor 31 obtains an asymmetry value based on the amplitude of the signal subjected to error correction (S108). By obtaining an asymmetry value, servo processor 31 can evaluate the writing quality of LD 4 based on its own corrected signal. Upon obtaining an asymmetry value, servo processor 31 obtains the optimum write power to be employed in subsequent recording of a signal based on the relationship between an asymmetry value and write power (S110). Upon obtaining the optimum write power, servo processor 31 waits until data is accumulated in buffer 32 (S112). Upon data accumulation in buffer 32, LD 4 resumes data recording at the optimum write power obtained at S110 (S114).

Thus, the optical disk writing apparatus of the present embodiment obtains an asymmetry value β with respect to the region recorded during write pause, or during the period of time in which there is no data to be recorded in buffer 32. The period of write pause becomes longer in proportion to a higher recording rate (only in the case where the amount of data to be recorded and the recording time therefore are to be defined), or in proportion to a lower bit rate of a motion picture. Upon obtaining an asymmetry value β, determination is made whether the write power prior to data recording is optimum or not. When the write power is not optimum, the write power to be employed in the next writing operation is calculated. Upon termination of the write pause period, recording is resumed at the calculated write power. When there is no more data to be recorded, a write pause mode is entered again. Asymmetry value β is obtained, and the subsequent write power is calculated again, as necessary. Thus, LD 4 is controlled such that the laser beam output is constantly optimum. By virtue of output optimization, the recording quality onto an optical disk is improved.

Figure 7:
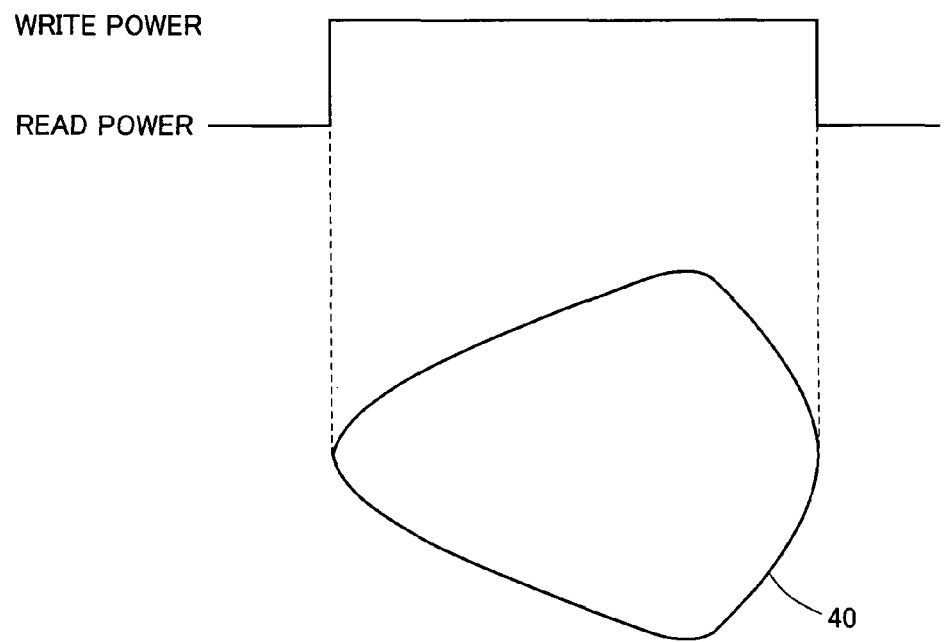
FIG. 7 is a diagram to describe a configuration of a pit on an optical disk.
Figure 8:
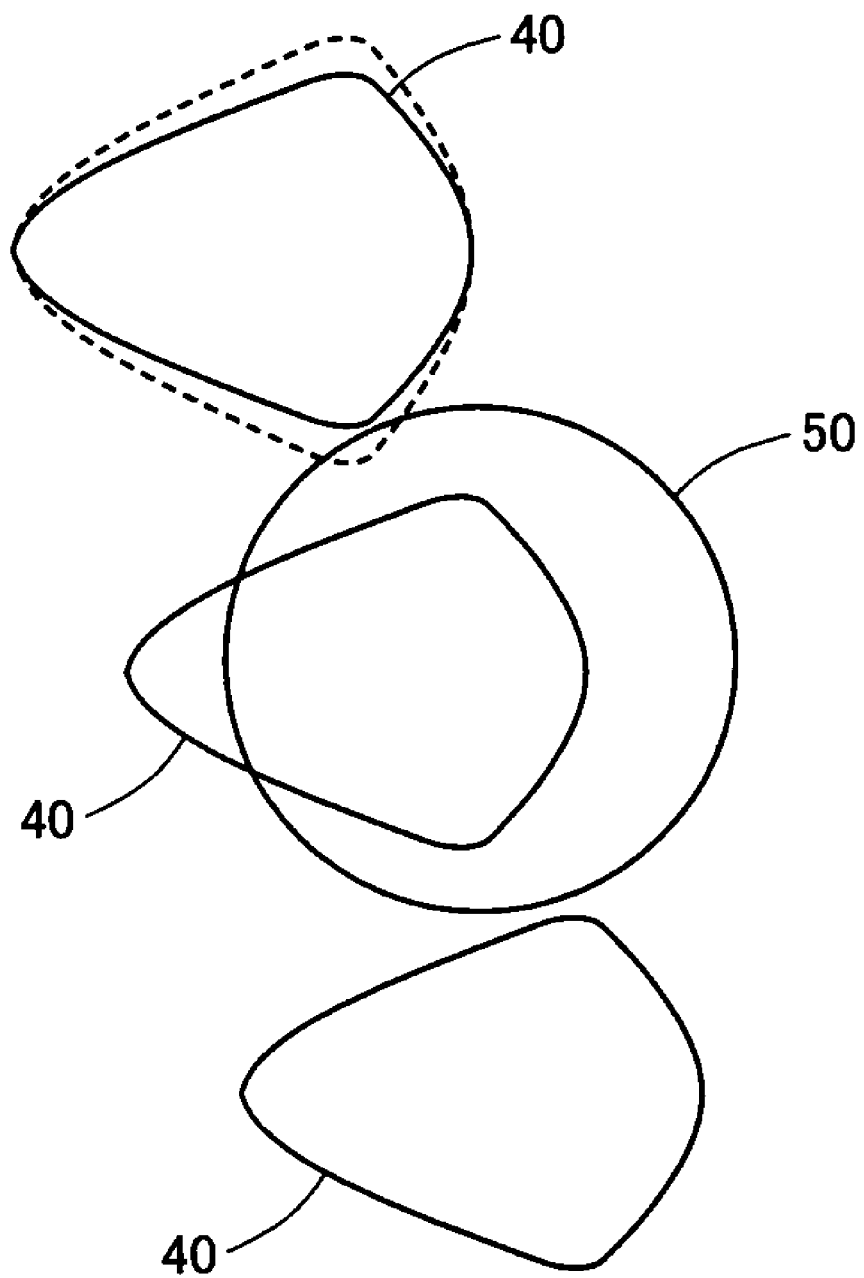
FIG. 8 is a diagram to describe the effect of the recording quality on the reproduction quality.

This will be described in detail with reference to FIGS. 7 and 8. By emitting a laser beam of a write power onto DVD 100, a pit 40 is formed at the recording layer of DVD 100. FIG. 7 represents the change in the laser beam intensity and a plan view of pit 40 in correspondence. The width of pit 40 becomes larger as the laser beam intensity increases. The width of pit 40 becomes smaller as the laser beam intensity is reduced. There will be variation in the size of pit 40 even if the laser beam intensity is identical when the quality of the DVD is poor. Variation in the size of pit 40 induces variation in the signal obtained in the reproduction mode. Furthermore, a pit 40 of excessive size will affect reproduction of an adjacent track. FIG. 8 represents such adverse effects. Pit 40 depicted in a solid line in FIG. 8 represents a pit recorded by a laser beam with an appropriate intensity. The pit depicted in a broken line represents a pit recorded by a laser beam of excessive intensity. It is apparent that, if the width of pit 40 becomes too large, the laser beam emitted onto an adjacent pit will be reflected. Therefore, it will become difficult to read out a signal properly. This implies that the recording quality can be improved by recording a pit by a laser beam with an appropriate intensity.

Improvement in the recording quality allows data to be reproduced in a favorable manner, independent of what optical disk writing apparatus is employed to reduce data from an optical disk. The same applies to the case where data is recorded onto an optical disk of poor quality. Since the recording quality is improved, the error rate in reproducing data is reduced. By virtue of reduction in error rate, generation of block noise can be suppressed. It is to be noted that an asymmetry value is calculated after there is no more data in buffer 32 in the optical disk writing apparatus of the present embodiment. Such calculation of an asymmetry value allows control in real time, and reduces the mechanical operation of optical pickup 1. Reduction in the mechanical operation is advantageous in that the time required for operation or energy consumption is reduced. Thus, an optical disk writing apparatus that can maintain the optimum write power in real time with a simple configuration, suppressing extra time and energy consumption, improving the recording quality, and reducing the error rate even for media of poor fabrication quality, can be provided.

At S108, servo processor 31 may obtain an asymmetry value based on an amplitude obtained by processing the signal amplified by RF amplifier 21 through a method other than simple AD conversion. As a method other than simple AD conversion, there is known a method by sampling. Specifically, an asymmetry value can be obtained by the following steps through sampling. At the first step, the signal amplified by RF amplifier 21 is detected by servo processor 31 at a predetermined cycle. This cycle is determined by the designer of the optical disk writing apparatus. At the second step, servo processor 31 identifies the maximum value and the minimum value from the detected signals. At the third step, the maximum and minimum values identified at the second step are taken as the maximum and minimum values of the signal amplified by RF amplifier 21 for calculation of an asymmetry value.

The approximate expression representing the relationship between the laser beam intensity and asymmetry value is determined based on the specification of the physical format of the DVD. As an alternative to obtaining this expression at S100, such an expression may be recorded in advance in buffer 32.

Alternatively, a database representing the relationship between the laser beam intensity and asymmetry value may be recorded in buffer 32 instead of the approximate expression representing the relationship between the laser beam intensity and asymmetry value.

Furthermore, jitter may be obtained instead of an asymmetry value at S108. In this case, servo processor 31 refers to a data table to obtain the subsequent optimum write power at S110. For example, determination is made that the write power is too high when the jitter is greater than a predetermined signal. The data table has the value of write power and the value of jitter set in correspondence. Such a data table can be stored in buffer 32 in servo processor 31.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An optical disk writing apparatus configured to write data onto a recording region of an optical disk, the recording region including a plurality of blocks, the plurality of blocks comprising an error correction code, the optical disk writing apparatus comprising:

a buffer for recording data, a supply circuit configured to supply data to the buffer, a writing device configured to write data recorded in the buffer onto the recording region of the optical disk, a detector configured to read out from the recording region of the optical disk a signal representing data written by the writing device during a period in which an amount of data recorded in the buffer and not yet written onto the optical disk is less than a predetermined amount, a correction processor configured to correct in one of the plurality of blocks an error in the signal read out by the detector using the error correction code based on a single corresponding block, wherein the correction processor corrects the error in each of the plurality of blocks, an evaluation processor configured to evaluate a writing quality of the writing device using a signal output by the correction processor, and a control processor configured to control an energy density employed in writing data onto the optical disk by the writing device according to evaluation by the evaluation processor.

2. The optical disk writing apparatus according to claim 1, wherein the detector reads out the signal at an arbitrary time during a period starting from when the amount of data becomes zero until the amount of data arrives at the predetermined amount.

3. The optical disk writing apparatus according to claim 2, wherein the predetermined amount corresponds to integral multiples of one of the plurality of blocks.

* * * * *